Dec. 30, 1941.   W. A. SCHMIDT   2,268,170
DUST COLLECTING SYSTEM
Filed May 15, 1939   5 Sheets-Sheet 3

Inventor
Walter A. Schmidt
By Arthur P. Knight and
Alfred W. Knight
Attorney

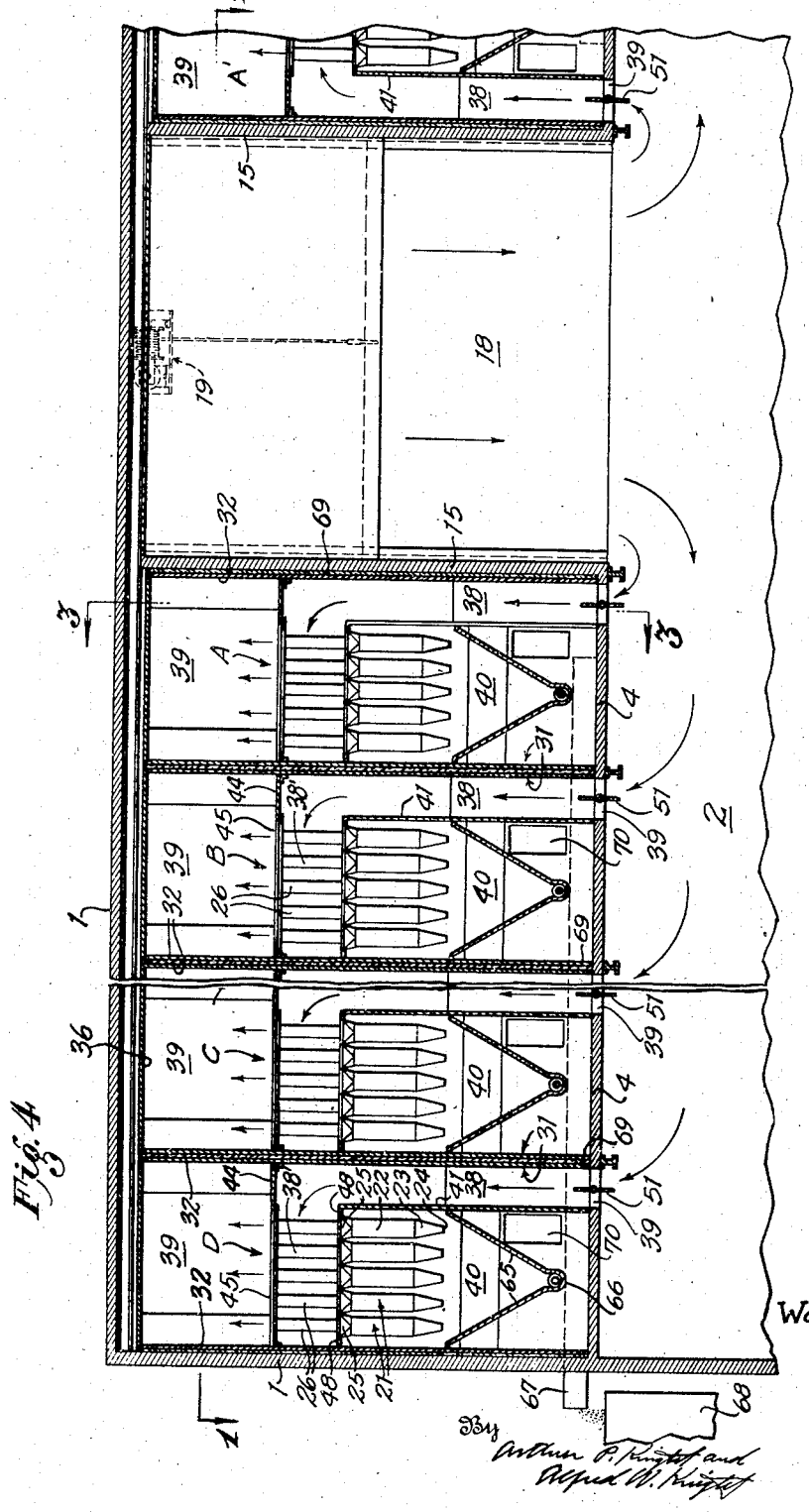

Dec. 30, 1941.  W. A. SCHMIDT  2,268,170
DUST COLLECTING SYSTEM
Filed May 15, 1939  5 Sheets-Sheet 5
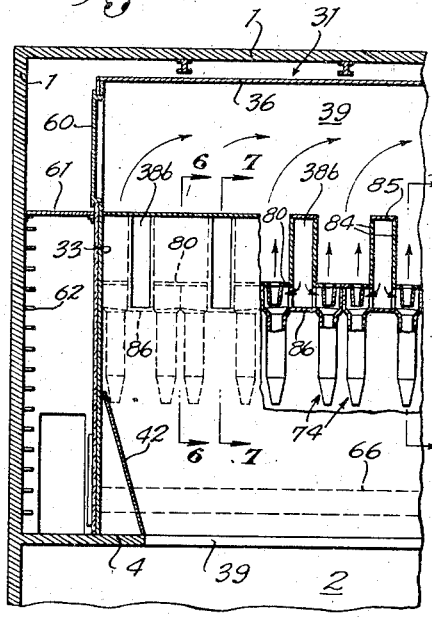
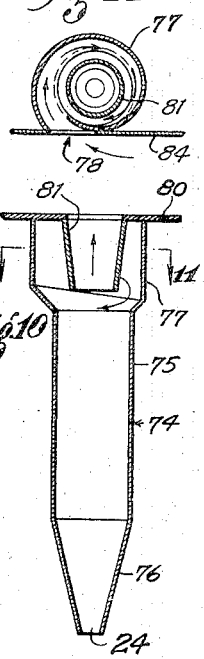
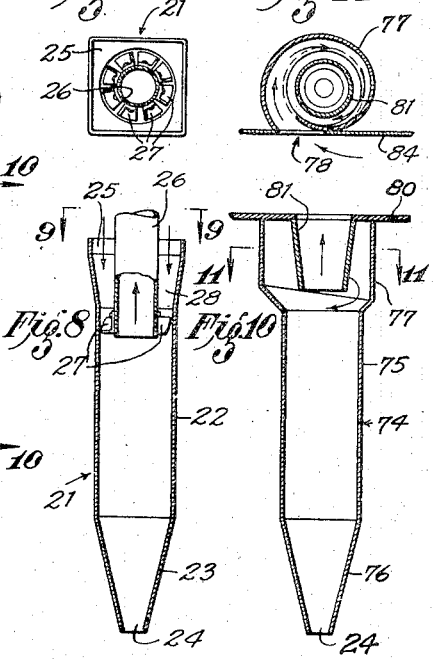
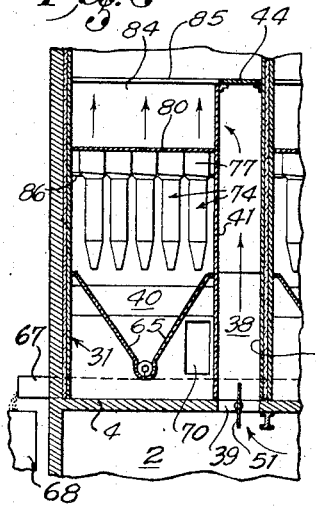
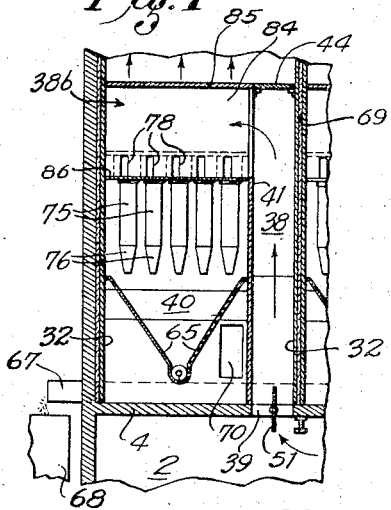
Inventor
Walter A. Schmidt
By Arthur P. Knight and
Alfred W. Knight
Attorney Patented Dec. 30, 1941

2,268,170

UNITED STATES PATENT OFFICE 2,268,170

DUST COLLECTING SYSTEM

Walter A. Schmidt, Los Angeles, Calif., assignor to Western Precipitation Corporation, Los Angeles, Calif., a corporation of California Application May 15, 1939, Serial No. 273,786
In Canada November 8, 1938

5 Claims. (Cl. 183—34)

This invention relates to dust collecting systems in which suspended dust is separated from gases by centrifugal action, and the main object of the invention is to provide a system of this type which is adapted to handle a large volume of gas at a high dust collecting efficiency and which is of compact design and relatively inexpensive construction.

The invention pertains more particularly to dust collecting systems employing cyclone dust separators of relatively small diameter in order to obtain high dust collection efficiency. Application of small diameter cyclone separators to treatment of large gas volumes makes it necessary to employ a large number of such separators through which the gas may be passed in parallel, in view of the fact that only a relatively small volume of gas, per unit time, can be passed through each such separator at a reasonable pressure drop or draft loss across the separator.

A particular object of the invention is to provide a system in which a large number of individual cyclone dust separators, each of which may be, and preferably is, of relatively small diameter, are arranged in a plurality of units each unit comprising a plurality of such separators; and in which these units are compactly arranged and are provided with branch gas passages for conducting the gas to and from the respective units and with individual dust receiving chambers for receiving separated dust from all the cyclone separators of the unit.

A further object is to provide a system of the type above described in which the space occupied by the gas passages and/or dust receiving chambers of the several units is also utilized to provide a means of access to the individual separators for such purposes as inspection, cleaning, repair, replacement, and the like. In this connection, it is a particular object to provide wall means defining a plurality of separate spaces, each space surrounding all the cyclone separators of one of the units, and to also provide suitable partitions subdividing each such space into at least three separate chambers of which one constitutes a branch gas inlet passage for the unit in that space, one a branch gas outlet passage for that unit, and one a dust receiving chamber for that unit, and to make at least one of these three chambers of sufficient size to permit passage of a man therethrough. By providing a suitably positioned door by which a man may enter this one chamber through which he can pass, ready access may be had to all the individual separators of the unit through that chamber.

A further object is to provide, in a system of the type above described, means for separately controlling and shutting off the flow of gas through each one of a plurality of units of which each unit comprises a plurality of cyclone separators, whereby the distribution of gas flow through the different units may be controlled, and any one or more of the units may be taken out of operation, for such purpose as inspecting, cleaning, repairing or replacing the separators of that unit, or for the purpose of changing the number of units in operation in accordance with variations in the volume of gas to be cleaned (as may sometimes be desirable in order to maintain the desired dust collecting efficiency and/or pressure drop), or for any other purpose.

A further object is to provide a dust collecting system which embodies a plurality of cyclone dust separators and which is particularly adapted for handling hot gases.

A particular object, in connection with handling hot gases in a construction including a plurality of cyclone dust separators arranged in a plurality of units each comprising a plurality of such separators, is to provide wall means defining a plurality of separately enclosed spaces, each space completely surrounding all the separators of one of the units and communicating with the interiors of all of the separators of that unit, whereby all the separators are completely surrounded by hot gases. This causes the walls of the cyclone separators to be kept at a sufficient temperature to prevent undue cooling of the gases passing therethrough or condensation of moisture from such gases on interior surfaces of the separators or on dust therein. In many cases, hot gases from which dust is to be removed contain water vapor or other vapor in such proportion that condensation thereof occurs if the temperature of the gases is appreciably reduced, and it is generally desirable to prevent or minimize such condensation in cyclone dust separators of the type described herein, in order to prevent the separated dust particles from sticking together or to the walls of the separator and clogging the separators or the openings through which the dust is discharged therefrom. Furthermore, in case the hot gases also contain acid constituents of such nature that the condensate formed by cooling would have a corrosive action on the material of which the apparatus is constructed, the prevention of such condensation is highly important as a means of preventing such corrosion and insuring long life of the installation.

In a construction such as last described above, it is also an object of the invention to utilize the aforesaid enclosed spaces surrounding each unit of separators for the purposes of conducting hot gases to and from the separators and receiving separated dust discharged from the separation, by providing partition means within each such space, subdividing the same into branch gas inlet and gas outlet passages and a dust receiving chamber for the unit of separators within that space. According to a preferred embodiment of the invention, the elongated circular bodies of the cyclone separators of each unit, within which the separation of dust is effected by centrifugal action, are disposed substantially entirely within the dust receiving chamber associated with that unit.

Another object of the invention in connection with treatment of hot gases, is to provide a system in which a plurality of cyclone dust separators are arranged in a plurality of horizontally spaced units each comprising a plurality of separators, and in which means are provided for shutting off the flow of gas through any selected one of the units, and to also provide a heat insulating wall between each two adjacent units, in order that a temperature sufficiently low to permit a man to work inside it can be maintained in the unit which is shut off and in the branch gas inlet and gas outlet passages and the dust receiving chamber associated with that unit, even though hot gases are being passed through the adjacent unit or units.

In this connection, it is a further object to provide a separate wall means or casing completely enclosing each unit of separators, and to facilitate the provision of a heat insulating wall between each two adjacent units by forming the portions of such wall means, which are disposed toward each adjacent unit, as substantially plane vertical walls. By arranging the wall means of the several units with the plane vertical walls for each two adjacent units parallel to and suitably spaced from each other, a layer of suitable heat insulating material may be provided therebetween with a minimum of labor and expense, as by filling the space between these walls with loose insulating material, or placing preformed sheets of insulating material therebetween, or in any other convenient manner. As noted above, the space within the separate wall means or casing for each unit of separators may be subdivided by means of suitable partitions defining branch gas inlet and gas outlet passages and a dust receiving chamber for that unit.

How the above, as well as other objects not specifically mentioned, are attained will be better understood from the following description and the accompanying drawings which illustrate dust collecting systems in accordance with this invention; and referring thereto:

Fig. 4 is a partially broken away longitudinal vertical section on line 4—4 in Fig. 3;

Fig. 5 is a fragmentary vertical section like Fig. 3 with portions broken away, showing a modified form of cyclone separator;

Figs. 6 and 7 are fragmentary vertical transverse sections taken respectively on lines 6—6 and 7—7 of Fig. 5 showing details of the cyclone separators;

Figs. 8 and 9 are vertical median section and plan views respectively of a single vane-type cyclone separator as shown in Figs. 1-4; and Figs. 10 and 11 are vertical median section and plan views respectively of a single involute-type cyclone separator as shown in Figs. 5-7.

Figure 1:
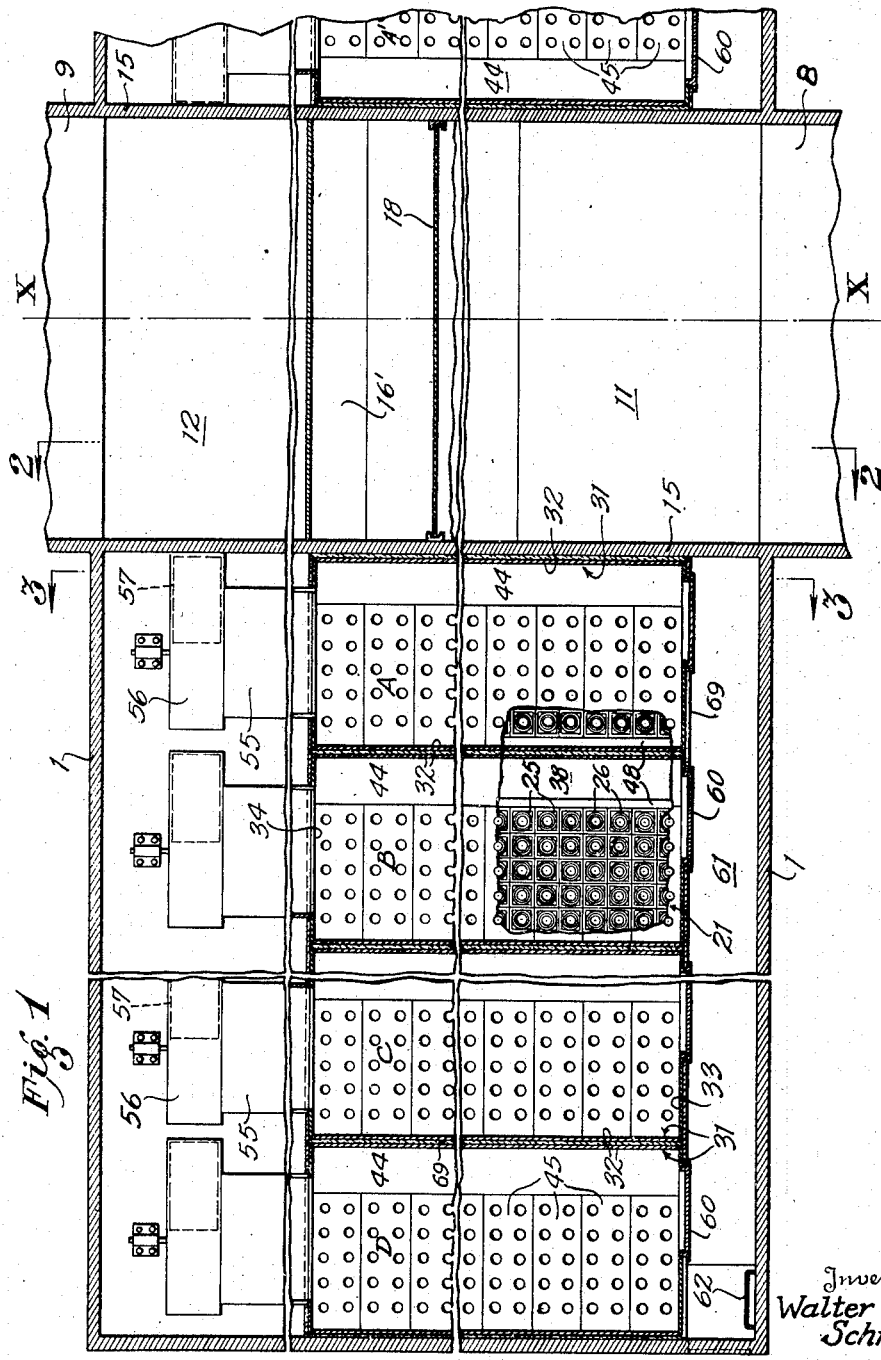
Fig. 1 is a partially broken away horizontal section showing one form of dust collecting system, taken on line 1—1 in Fig. 4.
Figure 2:
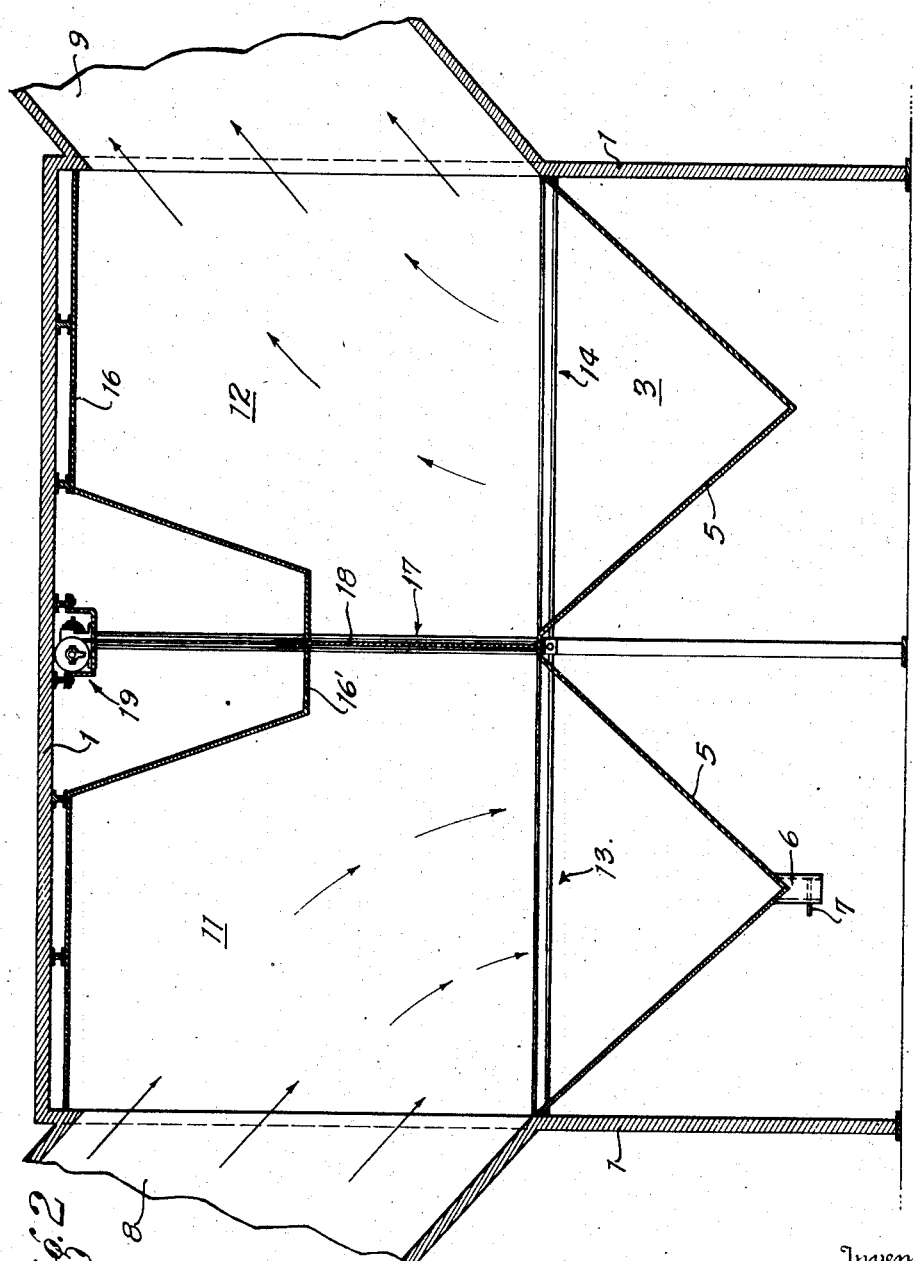
Fig. 2 is a transverse vertical section thereof on line 2—2 in Fig. 1.

Referring to Figs. 1-4, I have shown a dust collecting system comprising a plurality of units of cyclone separators located within outer housing 1. Fig. 1 shows only the central portion and one end of the housing 1, the other similar end of housing 1 not being shown. Within this end of the housing are four units of cyclone separators indicated generally at A, B, C, and D, though it will be understood that more or less than four units may be used if desired. The units A through D and the parts associated therewith as hereinafter described constitute a complete dust collecting system in accordance with this invention; but the common inlet and outlet flue systems shown are designed for use with a system which also includes a similar number of units of cyclone separators located in the other end of the outer housing 1, the housing being substantially symmetrical with respect to the center line X—X. The construction and arrangement of the separator units and other parts in the other end of the housing is substantially identical with those shown in the drawings. The first unit of this group of separator units in the other end of the housing is partially shown at A'.

A gas inlet duct 2 and a gas outlet duct 3 extend side by side throughout the entire length of the housing 1 and in the lower portion thereof, these inlet and outlet ducts being common to all of the units of cyclone separators. The tops of both of these ducts are closed by horizontal floor or partition 4 which extends over substantially the entire area of the housing and is provided with suitable openings for passage of gas as hereinafter described. The ducts 2 and 3 are of hopper shape, having sloping bottom walls indicated at 5 and the bottoms of the hoppers thus formed may be provided at suitable intervals with dust outlets 6 having gates 7 which are normally closed but which may be opened when desired for discharge of dust which may accumulate in the bottoms of the ducts.

Gas inlet flue 8 and gas outlet flue 9 communicate through openings in the side walls of the housing 1 at the mid-length thereof with centrally located inlet chamber 11 and outlet chamber 12 which communicate in turn through openings 13 and 14 in the horizontal partition 4 with the common gas inlet and outlet ducts 2 and 3 respectively. The chambers 11 and 12 are enclosed by vertical side-walls 15 and by a top wall 16 whose central portion 16' is extended downwardly to an intermediate level to partially separate the two chambers and assist in directing the flow of gas from inlet flue 8 down to duct 2 and from duct 3 up into outlet flue 9. The chambers 11 and 12 can be placed in direct communication through by-pass opening 17. By-pass 17 is normally closed by a partition or damper 18 which is provided with suitable means 19 as for example a motor driven hoisting drum, for raising it in order to permit direct communication between said chambers, so that the gas may be by-passed directly from the inlet flue 8 to outlet flue 9 when desired without passing through the cyclone separators.

Each separator unit A to D inclusive comprises a plurality of individual cyclone separators 21 which may be of any suitable design or construction, but each separator 21 is preferably of relatively small diameter, for example from about six inches to about two feet, although the invention is not restricted to the use of cyclones of any particular size or style. By way of illustration, I have shown the cyclone separators in Figs. 1–4 as being of the type illustrated more fully in Figs. 8 and 9.

Referring to said Figs. 8 and 9, said separator is shown as comprising an elongated tube portion 22 of circular cross section and preferably cylindrical, a conical lower portion 23 having a restricted dust outlet opening 24 at its lower end, and an upper gas inlet portion 25 whose lower end conforms in shape to the upper end of the tube portion 22. The upper end of inlet portion 25 is preferably square or rectangular so as to facilitate the assembly of a plurality of the separators in a unit. Disposed concentrically within the upper portion of the separator is a gas outlet pipe 26 which extends upwardly from a position adjacent the upper end of the separator tube portion 22 to a position above the upper end of the gas inlet portion 25 for connection to a gas outlet passage as hereinafter described, said pipe 26 being open at both ends. The pipe 26 is of somewhat smaller diameter than the upper end of the separator tube portion 22 so as to provide an annular space 28 for inflow of gas into the separator 21 through the open upper end of the inlet portion 25; and a plurality of inclined vanes 27 are mounted adjacent the lower end of the outlet pipe 26 and within the annular space around said pipe so as to impart a whirling motion to the gas entering the separator. The construction and mode of operation of cyclone separators of this type are more fully described in Canadian Patent No. 324,153 and U. S. Patent No. 1,909,184 issued to M. A. Lissman, and it is believed sufficient for the purpose of this application to state that the gas containing suspended dust is delivered into the upper end of the separator through the annular inlet passage 28 and is caused by vanes 27 to whirl rapidly about the vertical axis of the separator as the gas flows downwardly within the tube portion 22. The dust is separated by centrifugal action and is discharged downwardly through the restricted bottom opening 24, while the gas turns inwardly and upwardly within separator 21 and is discharged through outlet pipe 26. Due to the high velocity of the whirling motion of the gas and the small diameter of the separator, a high efficiency of separation of dust from the gas is obtained.

Figure 3:
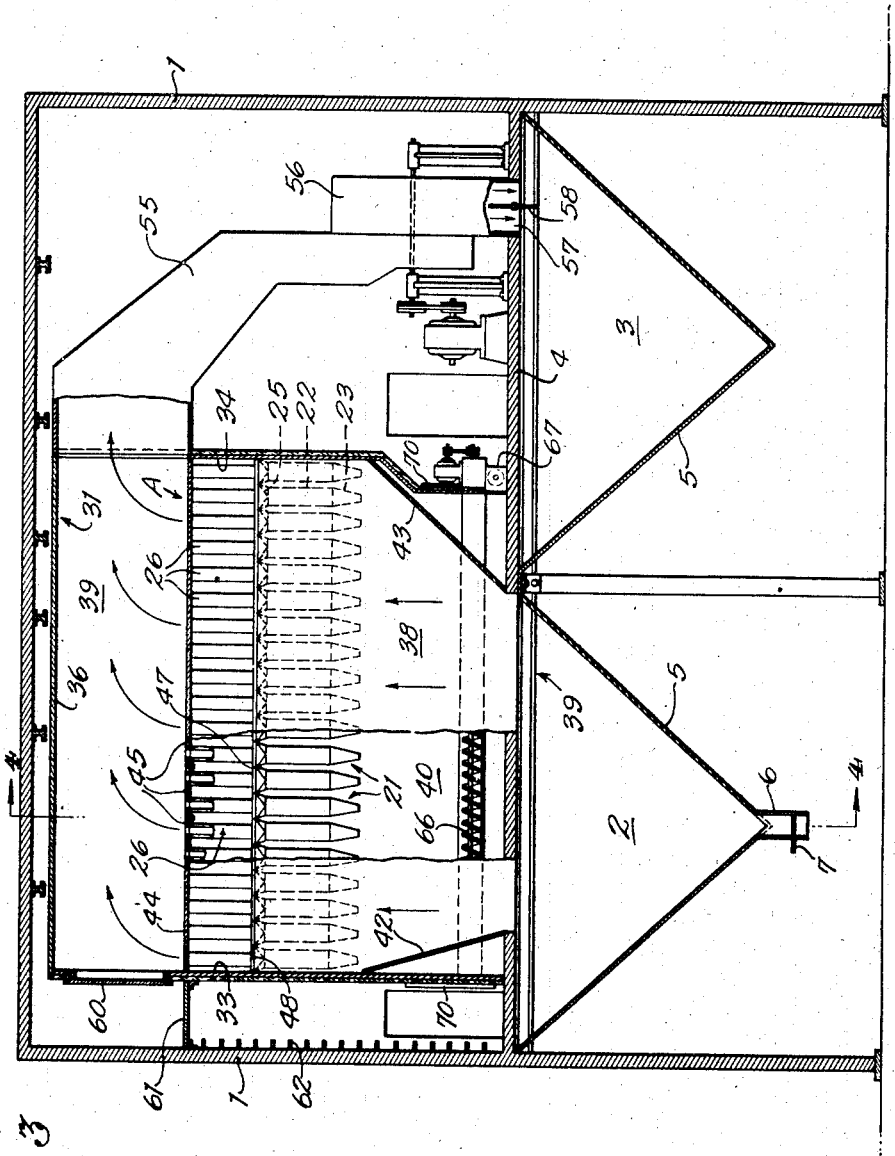
Fig. 3 is a transverse vertical section on line 3—3 in Fig. 1 with portions broken away to show the cyclone separators.

Referring again to Figs. 1, 3, and 4 it will be seen that each unit, such as the unit A, comprises a plurality of rows of cyclone separators 21. In Figs. 1 and 4, each such row of separators is shown as including five individual separators and extending in a direction longitudinally of housing 1 and the common inlet duct 2. The number of such rows of separators in each unit is best illustrated in Fig. 3, but it will be understood that any number of rows may be provided and that each row may include any number of separators.

Each of the separator units, such as A, is shown as completely enclosed within wall means designated generally as casing 31 which is preferably of rectangular cross-section, and includes two opposed substantially plane vertical sidewalls 32 and two vertical end walls 33 and 34. The casing 31 rests at its lower side on the horizontal partition or floor 4 and is provided with a top wall 36 closing the upper side thereof. The wall means forming each casing 31 encloses a space which entirely surrounds one unit of separators, there being a plurality of such casings and enclosed spaces of which each surrounds a unit.

Within the casing 31 for each separator unit I provide partition means sub-dividing the interior space of said casing into at least three chambers to provide a branch gas inlet passage 38, a branch gas outlet passage 39, and a dust receiving chamber 40 for all the separators of that unit. Each branch gas inlet passage 38 communicates at its lower end through an opening 39 in partition 4 with the common gas inlet duct 2 and extends up at one side of the assembled separator unit and over the upper ends of all inlet sections 25 of the separators of that unit, as indicated at 38'. The partition means which define and enclose this gas inlet passage 38 include vertical wall 41 spaced from one of the side walls 32 and extending up from opening 39 to the level of the upper ends of the inlet sections to separators 21, inclined end walls 42 and 43 extending upwardly from said opening 39 and meeting the end walls 33 and 34 at an intermediate level, and a top wall including plate 44 extending longitudinally of the casing 31 over passage 38 and a plurality of separate plate sections 45 each extending over two adjacent rows of separators 21. The outlet pipes 26 of the separators in two adjacent rows are secured to and open through one of these plate sections 45, whereby one of these plate sections and the outlet pipes connected thereto may be easily removed as a whole for such purposes as inspection or replacing. Removal of a plate 45 and the attached outlet pipes 26 also removes the vanes 27 mounted on the lower end of each pipe 26 as shown in Fig. 8 thus leaving tubes 22 entirely open and accessible from the upper end. In this manner, all parts of each separator can be reached easily for cleaning or replacement should occasion arise. An overhead traveling crane or the like can be provided if desired to aid in handling the plate sections 45. The square upper ends of the separators are tightly secured together at 47, as by welding, so that the separators, together with suitable supporting members 48 serve to effectively separate the portion 38' of the inlet passage from the dust receiving chamber 40. The supporting members 48 extend along the sides and ends of the assembled unit of separators, and serve to support the separators in place. A damper 51 is provided in the branch inlet passage 38 as shown in Fig. 4, preferably at or adjacent the opening 39. Each of the dampers 51 is independently adjustable for restricting the flow of gas through the branch inlet passage to the separators of the corresponding unit, and is independently movable to a position in which the damper completely shuts off flow of gas to that unit from duct 2. The damper 51 is omitted in Fig. 3 for simplicity of illustration.

The second of the chambers into which the interior of each casing 31 is divided by partition means is the branch gas outlet passage 39. This outlet passage is contained in the upper portion of the casing above the partition means provided by plate 44 and the series of plates 45. The branch passage is otherwise defined by top wall 36, opposing portions of side walls 32, and a portion of end wall 33. The cleaned gas is discharged upwardly from the plurality of separator outlet pipes 26 of each unit into branch outlet passage 39, from which the gas flows into a downwardly directed duct 55 which forms a continuation of passage 39 beyond wall 34. There is one such duct for each of the units of separators, and the duct preferably leads to a gas propelling means such as fan 56, although it will be understood that the draft for forcing gas through the dust collecting system as a whole may be provided by other means. The advantage of the individual fan 56 associated with each unit of dust separators 21 is the great flexibility in operation afforded thereby, since the volume of gas flowing through any one unit may be increased or decreased to secure higher collection efficiency by regulating the fan as may be necessary. The fan discharges the gas downwardly through an opening 57 in floor 4 into common outlet duct 3 from which the gas flows upwardly to chamber 12 and outlet flue 9. Each opening 57 is provided with an individually operable damper 58 by means of which gas flow through the branch outlet from each unit may be restricted or may be completely shut off, since the dampers 58 are independently operable and movable to closed position.

Branch outlet passage 39 is made sufficiently large that a man may easily pass therethrough; and because it extends above all of the separators 21 affords means of ready access to the tubes for inspection, cleaning, repairing and the like. As shown in Fig. 3, the wall means forming casing 31 is provided with an access door 60 which opens into the branch outlet passage 39 at the end opposite duct 55. A walk-way 61, reached by ladder 62, is supported on the walls of housing 1 and extends longitudinally thereof at a height convenient to permit workmen to enter and leave the interiors of casings 31 through access doors 60.

The third main chamber formed within each unit enclosing casing 31 by the internal partition means is dust receiving chamber 40. The adjoining rectilinear edges of the several square inlet sections 25 form a closure means that separates the passage 38, containing incoming gas, from the space beneath, which forms a portion of the dust receiving chamber 40. The side walls of the dust receiving chamber are formed by opposed portions of one wall 32 and partition wall 41 and by the sloping walls 65 which form a hopper bottom to the dust receiving chamber. The ends of the dust receiving chamber are closed by end walls 33 and 34.

The elongated tubular portion 22 of each separator in which separation of the dust is effected extends downwardly into the dust collection chamber 40; and is preferably substantially entirely disposed within the dust chamber so that the tubes are surrounded by the heated gases within chamber 40. The dust discharged downwardly from separator outlets 24 enters dust chamber 40 and is concentrated by sloping walls 65 at a suitable dust removing means, such as a rotary screw conveyor 66. The dust in each of units A to D inclusive is discharged from the individual unit by conveyor 66 which dumps into a cross conveyor 67 that receives dust from all of the units. Cross conveyor 67 extends longitudinally of housing 1 and discharges the separated dust at the end of the housing into some suitable dust receptacle shown at 68, which receptacle may be a storage bin, a car, or suitable means for further transporting the dust.

Since the end walls 33 and 34 of each unit housing preferably extend down to floor 4, an access door 70 is preferably placed in each of these walls at each end of each unit to allow a workman to enter the space beneath hopper walls 65 in the event it is desirable to reach the screw conveyors 66.

Casings 31, each enclosing a unit of cyclone separators are placed in a longitudinally extending row with the adjacent vertical walls 32 of successive units A to D closely spaced horizontally from one another. This space between the walls of the units is then filled with some suitable heat insulating material 69. Likewise insulating material is placed between the vertical side walls of the end units A and D and the walls of housing 1 which are closely spaced from the casing walls. The exterior surfaces of end walls 33 and 34 are also covered with suitable heat insulating material, which may be applied in the same general manner as plaster or may be in the form of sheet material. Insulation underneath the several units is afforded by floor 4, and likewise insulation may be placed over the top walls 36 of the units if desired. It will be seen that the application of heat insulation materials to the walls of the casings 31 is greatly facilitated by making the vertical casing walls substantially plane and free from irregular projections and sharp corners. The substantially flat walls 32 of adjacent units form a space between them which readily may be filled with heat insulating material while the large flat expanse of the other exterior walls readily lends itself to simple and economical application of desired types of heat insulation.

The use of heat insulating means around the casing of each unit is desirable, in treating hot gases, from two standpoints. In the first place, when one unit is taken out of operation for repair, the heat that would be received into that unit from adjoining units in operation would be so great that it would be impossible for workmen to stay within the unit shut down unless suitable heat insulation were provided between each two successive units. For somewhat similar reasons heat insulation should be applied to the ends of each casing, since otherwise the heat radiated from the units into the interior of house 1 would render the building interior too hot for men to work therein and tend to various controls on the dampers, motors, and so on. In the second place, heat insulation is provided over at least the major portion of the area of casing 31 in order to keep the temperature drop between the incoming and outgoing gases as low as possible for each unit. In hot gases, there are frequently vapors such as water, which would condense upon any material decrease in temperature as the gas goes through the separators. This condensation would not only moisten the separated dust, thus rendering the dust sticky and liable to clog outlets 24 and conveyors 66, but also the condensate would often become highly corrosive because of acid fumes carried in the gases. Such corrosion is obviously undesirable since it greatly shortens the life of an installation or else renders the initial cost excessively high if corrosion resistant material is used. Insulation of the individual separators is rendered unnecessary because the space enclosed by each casing 31 is insulated to reduce heat losses from it. The enclosed space entirely surrounds each and every separator of the associated unit and the presence of heated gases in the space maintains the desired temperatures inside each separator, thus preventing condensation.

Having in mind the construction described above, the operation of the dust collecting system will now be described briefly. The stream of hot gases carrying in suspension solid particles to be separated out enters the collecting system by way of inlet flue 8. The stream passes downwardly through inlet chamber 11 and to duct 2 where the stream divides into two portions, one flowing to the left as viewed in Fig. 4, with the other portion flowing to the right to a series of units similar to those shown in Fig. 4. The gas flows upwardly from common duct 2 through openings 39 into the branch inlet passage 38 of each unit A to D inclusive. From portion 38' of inlet passage 38, the gas flows downwardly into inlet portions 25 of the individual cyclone separators 21 and enters the tubular portion 22 in which the separation of the solid particles takes place by centrifugal action. The separated dust drops out through opening 24 in the bottom of each separator while the clean gas is discharged upwardly through pipes 26 into the branch outlet passage 39 of that unit. From this description it will be seen that the portion of the space within each casing 31 occupied by the gas inlet and outlet passages communicating with the separator interiors, is continually filled with hot circulating gases. The portion of the casing interior occupied by the dust receiving chamber 40 also becomes filled with heated gas since this portion of the enclosed space is in communication with the separator interiors through openings 24 and a certain amount of localized gas circulation continually takes place through these openings, and the gas outside the separators 21 is heated by radiation from the walls of said separators.

Gas from each unit is discharged through the associated branch outlet duct 55 and enters fan 56 which, in turn, discharges into common duct 3. The outgoing streams of gas from the two halves of duct 3 unite at the center and move upwardly through chamber 12 and leave the collecting system by flue 9. It will be seen that the flow through each of the units may be regulated by regulating the position of either or both of dampers 51 and 58 placed respectively in the gas inlet and outlet passages of each individual unit. Also, the flow through the unit may be regulated by controlling the speed of fan 56. This regulation may take the form of increasing or decreasing the rate of flow through each unit in order to obtain even distribution of the gas between all units A to D and to operate these units under conditions of maximum collection efficiency. Likewise, regulation may take the form of completely shutting off one or more selected units, either to adapt the collection system to the volume of gas entering flue 8 or to take one unit out of operation for repairing or cleaning. If desired, any unit taken out of operation can be scavenged by opening access door 60 and continuing to operate fan 56 for a short time, thus cooling the interior of the unit and admitting clean air which will permit men to work inside the unit.

Although I have thus far shown and described my invention as being applied to a vane-type cyclone separator, such as shown in detail in Figs. 8 and 9, it will be realized that the invention is in no way limited thereto, and that other types of cyclone separators may be used. As an example of a modified form of cyclone separator, I may substitute for the vane-type separator, the involute type of separator illustrated in Figs. 10 and 11.

The cyclone separator 74 shown in Figs. 10 and 11 comprises an elongated tube portion 75 which is of circular cross-section and preferably cylindrical, a conical lower portion 76 having a restricted dust outlet opening 24 at its lower end, and an upper gas inlet portion 77 provided with a lower end conforming in size and shape to the upper end of tube 75. As may be seen in Fig. 11, the peripheral wall of portion 77 is formed in the shape of a spiral or involute, and is provided with an opening 78 at one side through which gas enters the separator. The top end of each tube is closed by a plate 80, and on this plate is supported a conical outlet member 81 disposed concentrically of tube 75. An outlet opening is provided in plate 80 in registration with the upper end of outlet member 81.

The construction and mode of operation of the type of cyclone separator shown in Figs. 10 and 11 are more fully set out in Canadian Patent No. 305,472 and U. S. Patent No. 1,990,943 issued to G. H. Horne et al., and it is believed sufficient for the present application to describe the operation briefly. Gas carrying suspended dust enters each individual separator 74 through opening 78 in a generally horizontal direction. The gas stream is given a whirling motion about the axis of the separator by the involute section 77. As the gas spirals downwardly within tube portion 75, the dust is separated by centrifugal action and is discharged downwardly from the tube through outlet 24, while the cleaned gas turns inwardly and upwardly within tube 75 and is discharged through outlet pipe 81. Because of the high velocity of the whirling motion obtained with a small diameter separator, a high efficiency of dust separation is obtained.

Figs. 5, 6, and 7 illustrate how the specific construction details of the collection system may be modified to accommodate the involute type of separator; and it will be understood that the general arrangement of the separators and units, each unit comprising a plurality of separators, and the various branch inlet and outlet passages, is the same as described above except for those changes necessary to accommodate the involute separator, which changes will now be described. As before, the gas enters each casing 31 enclosing a unit of separators through branch inlet passage 38, the gas rising upwardly therein and then moving horizontally at the upper ends of the separators. As may be seen, particularly from Figs. 5 and 7, the upper portion of passage 38 is in this form of the invention subdivided into a number of smaller passages 38b, which are open at one end and are defined by vertical plates 84, and horizontal plates 85 and 86. The inlet openings 78 of the separators register with similar openings in plates 84 to admit gas to the separators from portions 38b of the gas inlet passage 38.

As before, separators 74 are arranged in rows of five disposed longitudinally of housing 1, and one such row is placed at each side of each gas passage 38b. Plates 80 extend the entire distance between two successive vertical plates 84 and help define the lower portion of the gas outlet passage 39, into which all separators 74 of one unit discharge through the outlet openings in plates 80. The gas is discharged from outlet passage 39 into duct 55 in the manner previously described.

It will be seen from the drawings that the interior of each casing 31 is subdivided by partition means into at least three main chambers comprising a branch gas inlet passage, a branch gas outlet passage, and a dust receiving chamber in the same general manner as set forth in connection with the figures previously described. The gas inlet passage 38 within each casing is defined by the various partitions 41, 44, 84, 85 and 86. The branch gas outlet passage 39 occupies the upper portion of each casing above the partition means that include plates 80, 84 and 85. The dust collection chamber occupies the lower portion of the casing below plates 80 and 86, and above the sloping wall 65, the side walls of this chamber being wall 32 and partition wall 41. The casing walls 32 and 34 serve as common end walls for all three chambers. It will be noticed that in this construction the tubular portion of the cyclones within which dust separation is effected is completely, or at least substantially so, disposed within the dust collection chamber 40.

The several chambers formed within each casing 31 by the various partition means are so arranged with respect to the individual cyclone separators 74 of the unit enclosed by the casing 31 that the chambers, taken as a whole, substantially entirely surround each individual separator. In this way each separator is surrounded by a body of hot gas and the separator walls, as well as the separator interior, are maintained at approximately the temperature of the incoming gas and in this way condensation of vapors is avoided. The heated gases occupying the space within casing 31 prevent loss of heat from the interior of the individual cyclones and render unnecessary the individual insulation of each cyclone separator. It is thus sufficient to surround each casing 31 with heat insulating material 69, and this is accomplished in the manner previously described, since the side-by-side arrangement of the several casings enclosing the succession of units A to D inclusive is retained.

It will be seen from Fig. 5 that the gas outlet passage 39 for each unit is sufficiently large to permit passage of a man therethrough, and that entrance to the passage is afforded through an access door in wall 33 of each unit, the access door being reached by ladder 62 and walkway 61. When inside passage 39 a workman may walk along plate 44 and plates 85 to reach the individual separators for purposes of inspection and cleaning, etc.

Although not specifically shown in connection with Figs. 5 to 7 inclusive, my invention contemplates the use, in the same manner as previously described, of individual dampers or flow-restricting means in the branch inlet and outlet passages for each unit, and the use of a fan or other gas propelling means in the branch passages for each unit, although such separate gas propelling means are not essential in all cases, where other means is used to provide the necessary draft for forcing gas through the system.

Having described in detail various forms of my invention, it will be understood that changes may be made in the construction and arrangement of parts without departing from the spirit and scope of my invention; consequently, it is desired that the foregoing description be construed as illustrative of rather than limitative upon the following claims.

I claim:

1. A dust collecting system for treatment of hot gas comprising a plurality of cyclone separators arranged in a plurality of horizontally spaced units each unit comprising a plurality of cyclone separators; a substantially plane vertical heat insulating wall of heat insulating material between each two adjacent units of cyclone separators; a common gas inlet duct for all the units; a common gas outlet duct for all the units; and means for shutting off gas flow through any selected unit.

2. A dust collecting system for treatment of hot gas comprising a plurality of cyclone separators arranged in a plurality of units each unit comprising a plurality of cyclone separators; a plurality of casings each of which substantially surrounds one of said units and is provided with two opposed substantially plane vertical side walls, all of said casings being located in a longitudinal row with each of said casings having one of said vertical side walls closely spaced from a vertical side wall of each adjacent casing; heat insulating means disposed between the side walls of each two adjacent casings; a common gas inlet duct for all the units; a common gas outlet duct for all the units; and means for shutting off gas flow through any selected unit.

3. A dust collecting system as set forth in claim 2, in which each of said casings is of substantially rectangular horizontal cross section and is provided with partition means within that casing subdividing the interior thereof to provide branch gas inlet and gas outlet passages and a dust receiving chamber for the unit of separators within that casing.

4. A dust collecting system for treatment of hot gas comprising wall means defining a plurality of separately enclosed, adjoining spaces; a plurality of individual cyclone separators in each space; partition means within each space defining branch gas inlet and gas outlet passages in that space communicating with the cyclone separators in that space; gas inlet means communicating with the branch gas inlet passages of all the spaces; gas outlet means communicating with the branch gas outlet passages of all the spaces; and said wall means including heat insulating means interposed between adjoining spaces to retard the flow of heat from one space in which the cyclone separators are in operation into an adjoining space in which the cyclone separators are not in operation.

5. A dust collecting system comprising a plurality of cyclone separator tubes open at the inlet end to receive a dust laden air stream and open at the other end to discharge separated dust; inlet sections at the inlet end of the tubes joining them together and forming a part of wall means defining a dust collecting space into which the tubes discharge separated dust; a plurality of gas outlet pipes arranged one concentrically of each separator tube leaving an annular gas inlet around the outlet pipe, the outlet pipes extending out beyond the separator tubes; a plurality of vanes mounted on the lower end of each outlet pipe and located in said annular inlet; and a plurality of individually removable plates to each of which is attached a plurality of the outlet pipes; said plates forming part of wall means that defines a gas outlet passage into which all the outlet pipes open and that defines, in conjunction with said inlet sections, an inlet passage communicating with all the separator tubes, each of the plates and attached outlet pipes and vanes being removable as a unit to permit access to the separator parts.

WALTER A. SCHMIDT.